United States Patent
Tenenboym et al.

(10) Patent No.: US 8,683,605 B1
(45) Date of Patent: Mar. 25, 2014

(54) LONG-TERM VALIDATION OF A DIGITAL SIGNATURE STATUS INDICATOR

(75) Inventors: Isak Tenenboym, San Jose, CA (US); Philip Levy, Los Altos, CA (US); Marc Kaufman, Woodside, CA (US); John Landwehr, Vienna, VA (US)

(73) Assignee: Adobe Systems Incorporated, San Jose, CA (US)

( * ) Notice: Subject to any disclaimer, the term of this patent is extended or adjusted under 35 U.S.C. 154(b) by 10 days.

(21) Appl. No.: 13/431,803

(22) Filed: Mar. 27, 2012

(51) Int. Cl.
*G06F 7/04* (2006.01)

(52) U.S. Cl.
USPC ............. 726/26; 713/176; 713/156; 713/178; 713/164; 380/30; 705/35

(58) Field of Classification Search
USPC .............. 726/26; 713/176, 164, 156; 380/255
See application file for complete search history.

(56) References Cited

U.S. PATENT DOCUMENTS

| | | | | |
|---|---|---|---|---|
| 5,373,561 A * | 12/1994 | Haber et al. | ................... | 713/157 |
| 6,404,337 B1 * | 6/2002 | Van Till et al. | ............... | 340/569 |
| 6,584,565 B1 * | 6/2003 | Zamek | ........................... | 713/156 |
| 7,107,456 B2 * | 9/2006 | Baldwin et al. | ............... | 713/182 |
| 7,549,051 B2 * | 6/2009 | Dillaway et al. | .............. | 713/176 |
| 7,793,107 B2 * | 9/2010 | Takahashi | ..................... | 713/176 |
| 8,132,013 B2 * | 3/2012 | Meier | ............................ | 713/176 |
| 2005/0044369 A1 * | 2/2005 | Anantharaman | ............. | 713/176 |
| 2008/0086642 A1 * | 4/2008 | Takahashi | ..................... | 713/176 |
| 2011/0238999 A1 * | 9/2011 | Lee et al. | ...................... | 713/178 |
| 2011/0287974 A1 * | 11/2011 | Benvenisty et al. | ............ | 506/10 |
| 2012/0257752 A1 * | 10/2012 | Little | ............................ | 380/255 |
| 2013/0046990 A1 * | 2/2013 | Fahrny et al. | ................. | 713/176 |

OTHER PUBLICATIONS

Hugo Krawcayk, Simple Forward Secure Signatures, ACM, vol. 12, pp. 108-115.*
Adobe Systems Incorporated, Digital Signatures in the PDF Language, 2006, pp. 1-11.
Kiran et al., PKI Basics—A Technical Perspective, PKI Forum, Nov. 2002, pp. 1-12.
Adobe Systems Incorporated, Digital Signatures in Acrobat, 2007, pp. 1-17.

* cited by examiner

*Primary Examiner* — Cordelia Zecher
*Assistant Examiner* — Viral Lakhia
(74) *Attorney, Agent, or Firm* — Kilpatrick Townsend & Stockton LLP (57) ABSTRACT

Long-Term Validation (LTV) of a digital signature status indicator is disclosed. In some embodiments, the Long-Term Validation of a digital signature status indicator includes automatically determining whether a digital signature of a digitally signed document is LTV enabled based at least in part on LTV information; and generating an LTV status indicator that displays whether the digital signature of the digitally signed document is LTV enabled.

17 Claims, 11 Drawing Sheets

LONG-TERM VALIDATION OF A DIGITAL SIGNATURE STATUS INDICATOR

BACKGROUND OF THE INVENTION

Digital signatures can be used to sign many types of documents where traditional pen-and-ink signatures have been used in the past. Long-Term Validation (LTV) of a digital signature also exists.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Digital signatures can be used to sign many types of documents where traditional pen-and-ink signatures have been used in the past. However, the existence of a digital signature is not always adequate assurance that a document is what it appears to be. In order for a recipient of an electronic document to be able to trust the document, they must be able to verify that the electronic document has not been altered and that the document came from someone that can be trusted.

When signing an important paper document, a person usually signs it in front of a notary public or other trusted authority after providing them satisfactory evidence of their identity. Because the notary is considered to be trustworthy, the signature witnessed by the notary is also considered trustworthy. Use of a Public Key Infrastructure (PKI) provides a similar kind of trust.

In some embodiments, Public Key Infrastructure (PKI) based digital signatures use digital certificates issued by established Certificate Authorities (CA) which delegate the authority to issue digital certificates to Intermediate Certificate Authorities (ICA). In some embodiments, the latter also delegates the authority to issue digital certificates to subordinate ICAs.

In some embodiments, digital certificates are used to associate a particular person with a particular public key, and are formatted using specified rules (e.g., the rules specified in the ITU-T x-509 v3 standard). In some embodiments, a digital certificate includes or combines a public key and an identity. In some embodiments, a digital certificate is signed by the authority (e.g., CA or ICA) that issued it.

In some embodiments, digital certificates are associated with expiration dates after which they may not be used for signing, and ICAs may revoke a digital certificate before its expiration date (e.g., in case the digital certificate was stolen), so that they are not allowed to be used for signing after they are revoked. CAs/ICAs provide online services that check the revocation status of a digital certificate using, for example, an Online Certificate Status Protocol (OCSP) or a Certificate Revocation List (CRL). In some embodiments, the service is only provided for certificates that have not yet expired. In some embodiments, an application that validates a digital signature must consult the revocation status of a digital certificate used in a digital signature. Since CAs/ICAs generally do not provide revocation status information for expired certificates, a digital signature cannot be validated at a time after the expiration of the digital certificate.

Long-Term Validation (LTV) provides the ability to validate a digital signature against some time prior to the expiration of the digital certificate. For example, a digital signature can be processed to determine whether it was valid at the time of signing, even if the validation processing is performed long after the digital certificate has actually expired. In some embodiments, LTV provides the ability to have a digital signature on an electronic document continue to represent that valid status of the signature for an extended period of time after the signature was applied, even after PKI may no longer be available. In some embodiments, LTV of a digital signature provides the ability to validate a digital signature long after credentials (e.g., certificates, revocation information, etc.) used to sign a document have expired. The following example illustrates various scenarios involving validating a signature with LTV enabled and LTV not enabled.

An entity, known as "John," who would like to sign a document is issued a certificate by a certificate authority. The certificate authority has properly vetted John to verify his identity before issuing him a certificate. The certificate issued to John is valid for a certain time period (e.g., 5 months) and has a date by which it will naturally expire. At some point in time, John loses his certificate (e.g., the certificate was stolen) and would like the certificate to be revoked (e.g., so that it cannot be used by whoever stole it) at a date prior to when it would naturally expire. Additionally, the issuing certificate may also have a natural expiration date as well.

On January 1, a certificate associated with John's identity is issued to John by a certificate authority. The issued certificate is valid for a period of 5 months, and will naturally expire on June 1. In this example, the certificate associated with the certificate authority that issued John's certificate also has a natural expiration date, and will expire on August 1. On March 1, John loses his certificate (e.g., the certificate was stolen), and the certificate is revoked that day.

In this example, if John signed a document between January 1 and March 1, then there is an expectation that the signature should be valid. However, if John signs the document after March 1, then there is an expectation that any signature by John should be not valid since his certificate was lost and revoked.

In this example, on February 2, John signs a document. If John's signature undergoes the validation process before March 1, the certificate authority that issued John's certificate can be checked, or OCSP or CRL can be used to check that John's certificate has not been revoked. In some embodiments, revocation information is obtained (e.g., from Certificate Authority, OCSP, CRL, etc.). In some embodiments, the revocation information includes a date and time indicating when the certificate was revoked (in this example, March 1). In this example, if John's signature were validated at the time of signing, then the validation process would determine that John's signature was valid. However, in some cases, the certificate may not have been validated at the time of signing and at a later point in time, a party relying on the signature may wish to determine whether the signature had been valid at the time of signing.

Between March 1 and June 1, although the certificate has been revoked, it has not yet expired, and therefore revocation information associated with the certificate can still be obtained. However, as the revocation date/time of the certificate is March 1, prior to that date, the certificate was still valid. Therefore, if the signature undergoes the validation process between March 1 and June 1 to validate the signature against a time prior to March 1 (e.g., to check if the signature was valid at the time of signing on February 2), the validation process would determine that the signature was valid at that time.

However, if the signature undergoes the validation process between March 1 and June 1 to validate the signature against a time also between March 1 and June 1 (e.g., May 1), then the validation process would determine that the signature is invalid at that time because the certificate is revoked.

After June 1, the certificate has naturally expired and revocation information for the certificate can no longer be obtained. For example, a Certificate Authority typically does not keep revocation information for expired certificates, and in some embodiments, services such as OCSP or CRL also will not return information regarding an expired certificate.

If the signature is not LTV enabled and revocation information was not collected prior to the expiration of the certificate, then after June 1, the validation process does not have adequate information with which to use to determine whether the signature had been valid at a time prior to June 1. However, if LTV was enabled and revocation information were collected prior to the expiration of the certificate, then the validation process could still be invoked on the signature long after June 1 to validate the signature against an earlier time (e.g., time of signing) to determine that it had been valid at the time of signing.

In the above scenarios, although John's signature was valid at the time of signing, this cannot be verified at a later date where certificates involved have either been revoked or have expired. However, if support for Long-Term Validation for the digital signature is enabled, for example, by collecting and storing (e.g., in the document or in a container including the document) revocation information and any other appropriate LTV information (certificates and verification information) prior to any certificate expiring or being revoked, then it is possible for John's signature to be determined to have been valid at the time of signing even if the validation process occurs after June 1 (John's certificate naturally expires), or August 1 (Certificate Authority's certificate naturally expires and CA can no longer provide revocation information about the certificate it issued to John).

There is a need to provide for an indicator for digitally signed documents to inform users whether such digitally signed documents have Long-Term Validation (LTV) support or not and whether LTV support can be enabled for documents that are not already LTV enabled.

In some embodiments, enabling LTV support for a signature can only be done prior to the expiration or revocation of certificates. In some embodiments, an LTV status indicator indicates whether a digital signature is LTV-enabled, and if not, what can be done (if anything) and by when to enable LTV support. In some embodiments, the LTV status indicator comprises a warning indicating to a user that the signature is not LTV enabled (e.g., LTV information is missing from document) but that steps should be taken (e.g., collect and embed the missing LTV information in the document) before it is too late (e.g., expiration of digital certificates) to enable LTV support for the digital signature.

In some embodiments, LTV includes any necessary LTV information, such as digital signature validation information, either in the signature itself or along the content that a digital signature signs (e.g., embedded in the signature or appended as metadata).

Figure 1:
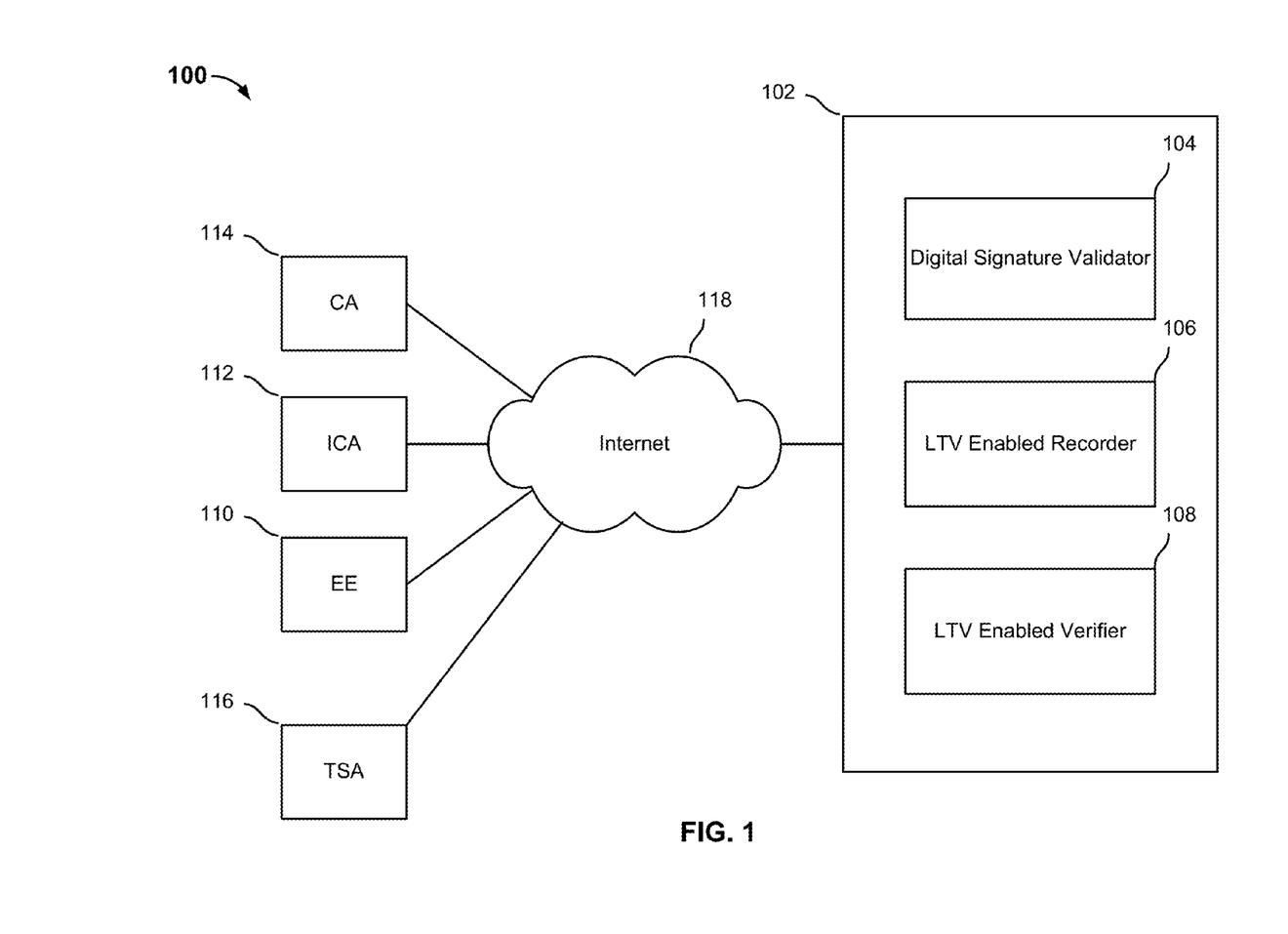
FIG. 1 is a system diagram illustrating an embodiment of a system for indicating LTV status of a digital signature in accordance with some embodiments.

FIG. 1 is a system diagram illustrating an embodiment of a system for indicating LTV status of a digital signature in accordance with some embodiments. In this example, digital signature LTV status indicator system includes digital signature validator 104, LTV enabled recorder 106, and LTV enabled verifier 108. In some embodiments, LTV enabled recorder 106 is included in digital signature validator 104. In some embodiments, in processing digital signatures to indicate their LTV status, system 102 communicates with end entity (EE) 110, one or more intermediate certificate authorities (ICA) 112, one or more certificate authorities (CA) 114, and optionally one or more timestamp authorities (TA) 116 associated with a digital signature. In some embodiments, system 102 communicates with EE 110, ICA 112, CA 114, and optional TA 116 via network 116. In various embodiments, network 118 includes one or more of a wired network, a wireless network, a local area network, a wide area network, the Internet, or any other appropriate network. In some embodiments, system 102 is implemented on a local machine associated with the digital signature and digital document, is implemented on a local machine associated with a receiver of a digital document that has had a digital signature applied to it, is implemented on a server, or implemented in any other appropriate location.

Figure 2A:
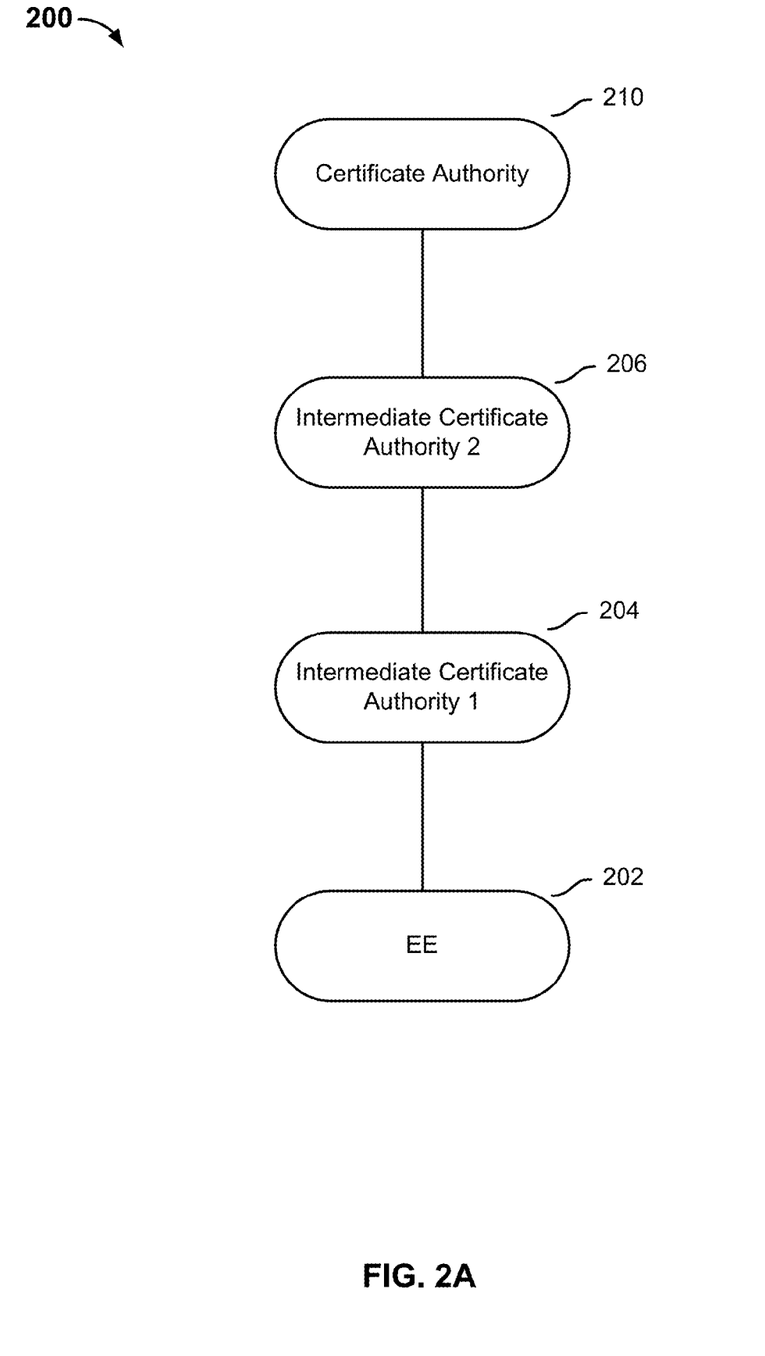
FIG. 2A is a diagram illustrating an embodiment of a certificate chain associated with a digital signature in accordance with some embodiments.

FIG. 2A is a diagram illustrating an embodiment of a certificate chain associated with a digital signature in accordance with some embodiments. In this example, an end entity 202 (e.g., signer of digital signature) is associated with an end entity certificate. The certificate associated with end entity 202 is signed by Intermediate Certificate Authority 1 204, who is associated with their own corresponding certificate. ICA 1's certificate is in turn signed by ICA 2 206, whose associated certificate is in turn signed by trusted anchor root Certificate Authority 210. In some embodiments, a certificate chain comprises a hierarchical tree structure that establishes a hierarchy of trust between an end entity and a trusted anchor root (e.g., CA) including zero or more ICAs. In some embodiments, a certificate chain comprises a chain of trust or a certification path between an end entity and a trusted anchor root (e.g., CA) including zero or more intermediate certificate authorities. In this example, a certificate chain with four levels is shown. In some embodiments, the end entity and each ICA in the certificate chain is associated with a certificate that is issued and signed by the CA or ICA one level above it in the hierarchy of trust. In some embodiments, a trusted root anchor issues a certificate for itself (e.g., is self-issued and self-signed).

In some embodiments, the digital signature is associated with a timestamp. In some embodiments, the timestamp is also signed by a higher certificate authority and the timestamp is associated with a timestamp certificate chain that can be used to validate the signature applied to the timestamp. In some embodiments, the trusted anchor root of a timestamp certificate chain comprises a Timestamp Authority that is associated with a trusted timestamp server.

Figure 2B:
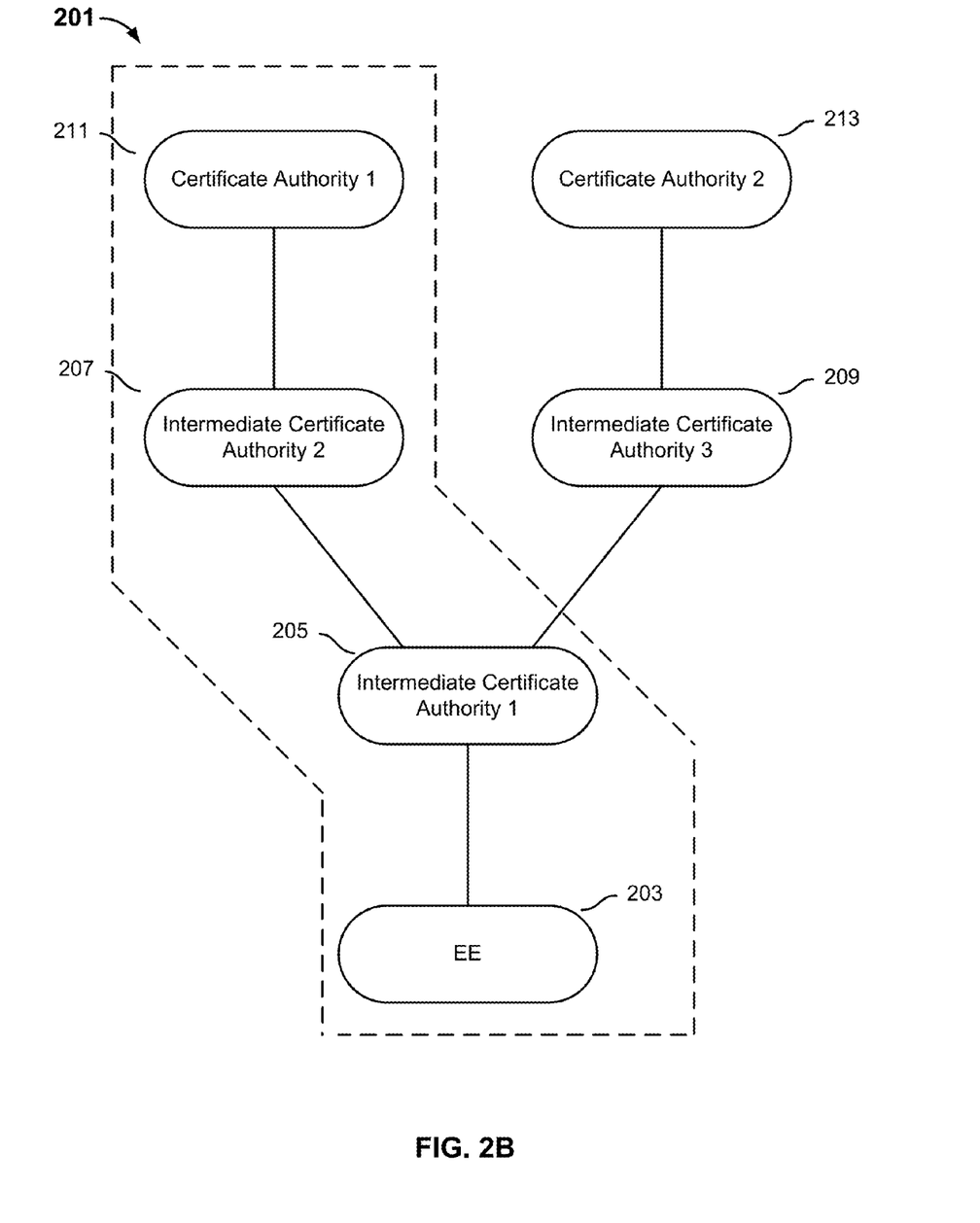
FIG. 2B is a diagram illustrating an embodiment of two certificate chains associated with a digital signature in accordance with some embodiments.

FIG. 2B is a diagram illustrating an embodiment of two certificate chains associated with a digital signature in accordance with some embodiments. In this example, End Entity certificate 203 is signed by Intermediate Certificate Authority 1 205. The certificate associated with ICA 1 205 is in turn cross-signed (or cross-certified) by both Intermediate Certificate Authority 2 207 and Intermediate Certificate Authority 3 209. The certificate associated with ICA 2 207 is in turn signed by the next higher authority, trusted anchor root CA 1 211. The certificate associated with ICA 3 209 is in turn signed by its next high authority, trusted anchor root CA 2 213. In this example, the cross-signing of ICA 1's certificate creates a two-way fork that results in two separate certificate chains stemming from ICA 1. In this example, the certificate associated with ICA 1 has been cross-signed. In some embodiments, an End Entity Certificate is also cross0signed by one or more certificate authorities. In some embodiments, a certificate is cross-signed n-ways (where n is a whole number) by n-number of authorities at the next higher authority level, resulting in n-certificate chains stemming from the certificate.

Figure 3:
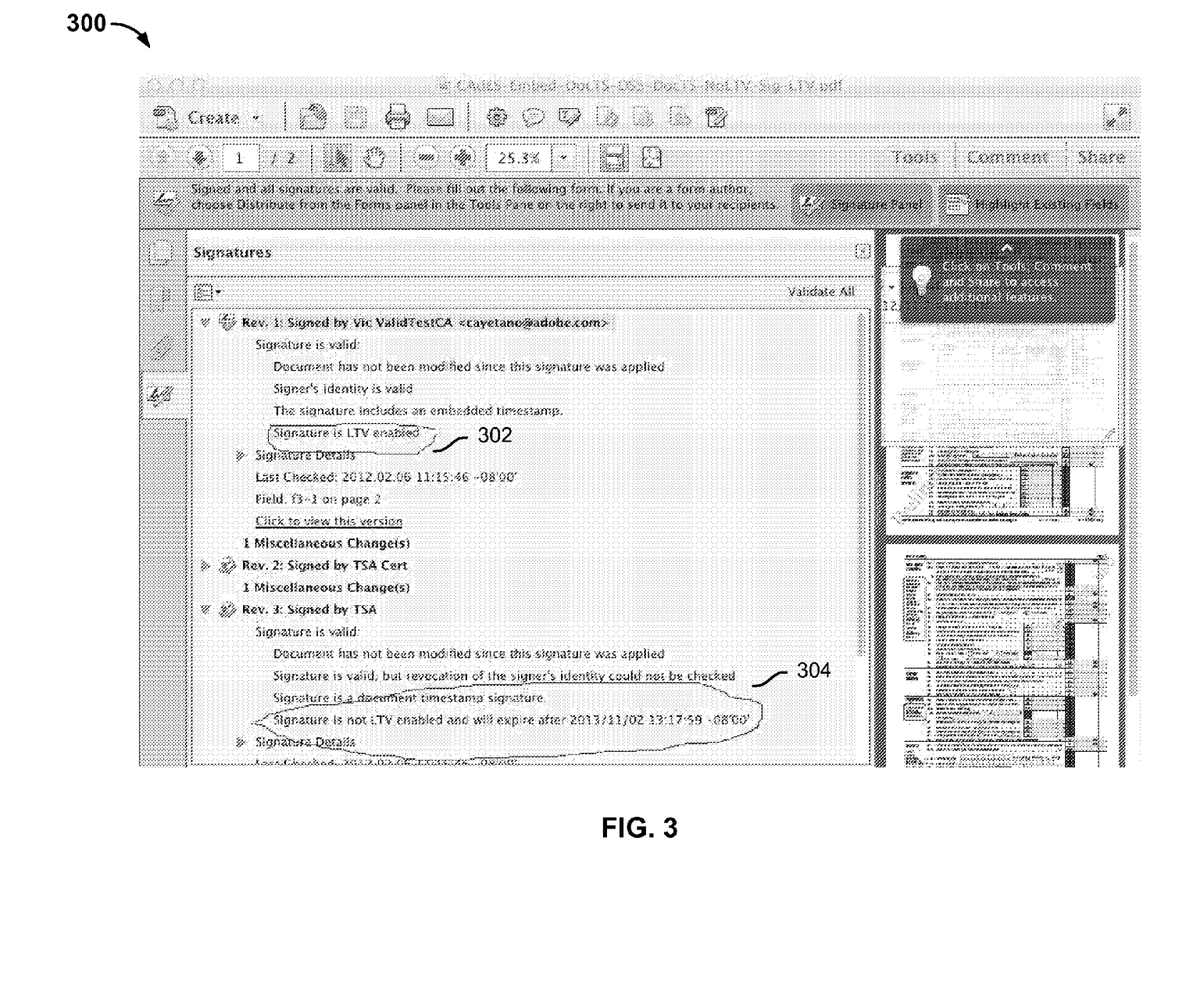
FIG. 3 is a diagram illustrating an example of a user interface for indicating LTV status of a digital signature in accordance with some embodiments.

FIG. 3 is a diagram illustrating an example of a user interface for indicating LTV status of a digital signature in accordance with some embodiments. In some embodiments, the LTV status indicator indicates whether a digital signature associated with a digitally signed document is LTV enabled (i.e., is capable of being validated long-term). In some embodiments, an indicator displays whether LTV information associated with the digital signature is present and/or complete. In some embodiments, the LTV status indicator includes an indication of expiration dates associated with certificates associated with a digital signature. In some embodiments, the earliest expiration date among all the certificates in at least one certificate chain associated with the digital signature is displayed. In some embodiments, by providing such expiration date information, a user is provided an indication of the earliest date by which it will not be possible to validate a digital signature, and in some embodiments, the user is provided with an option to store any information that would enable LTV support for the digital signature before the earliest certificate expires and information associated with the certificate can no longer be retrieved. In various embodiments, an LTV status indicator comprises a graphical indicator, a text-based indicator, a combination graphical/text-based indicator, or any other appropriate indicator. In some embodiments, the LTV status indicator may be a modifier for some other graphical or textual information as well. In this example, text-based indicator 302 indicates that the signature signed by Vic is LTV enabled. In this example, text-based indicator 304 indicates that the digital signature's timestamp, signed by TSA (timestamp authority), is not LTV enabled and that the digital signature will expire after 2013/11/02 (e.g., earliest expiration date of a certificate in at least one certificate chain associated with the digital signature is 2013/11/02).

In some embodiments, the LTV indicator indicates various LTV support notification states of the digital signature. In some embodiments, a first notification state of the LTV indicator indicates that the digital signature is LTV-enabled. In some embodiments, a second notification state of the LTV indicator indicates that the signature is not LTV-enabled, but further indicates a time by which LTV support for the signature could be enabled if appropriate actions were taken. In some embodiments, the LTV indicator further indicates any appropriate action(s) that should be taken to enable LTV support for the digital signature. For example, an LTV indicator could indicate that if LTV information for one or more certificates were embedded in the signature or signed document (e.g., action) before the expiration of the one or more certificates (e.g., terminal date), then the digital signature would become LTV-enabled. In some embodiments, the indicator comprises a warning (e.g., warning symbol, highlighted in red) that steps should be taken to ensure that LTV support for the digital signature is enabled before a time limit is exceeded or a deadline is passed. For example, in 304, the indicator comprises a mechanism for warning that the signature is not LTV-enabled, but that if an appropriate action were taken (e.g., embedding of LTV information) prior to the expiration date of 2013/11/02, then the signature would become LTV-enabled. In some embodiments, the timing of the display of the LTV indicator is determined at least in part on a time (e.g., deadline or terminal) by which an action must be taken before LTV support for the digital signature can no longer be enabled. In some embodiments, the LTV indicator provides a user an option to take indicated actions. In some embodiments, a third notification state of the LTV indicator indicates that the digital signature is not LTV-enabled and that there is no possibility of enabling LTV functionality for the digital signature (e.g., necessary certificate(s) have expired or been revoked and no available actions to take).

In some embodiments, graphical indicators may be used in place of or in addition to text-based indicators. For example, a clock with a green face could be used or displayed to indicate that a signature is LTV enabled, while a clock with a red face could be used or displayed to indicate that a signature is not LTV enabled but that action could be taken by a certain time to enable LTV support for the digital signature (or that there is no action that can be taken), with accompanying text indicating other types of information, including signature/certificate expiration information, timing information, or any other appropriate information.

Figure 4:
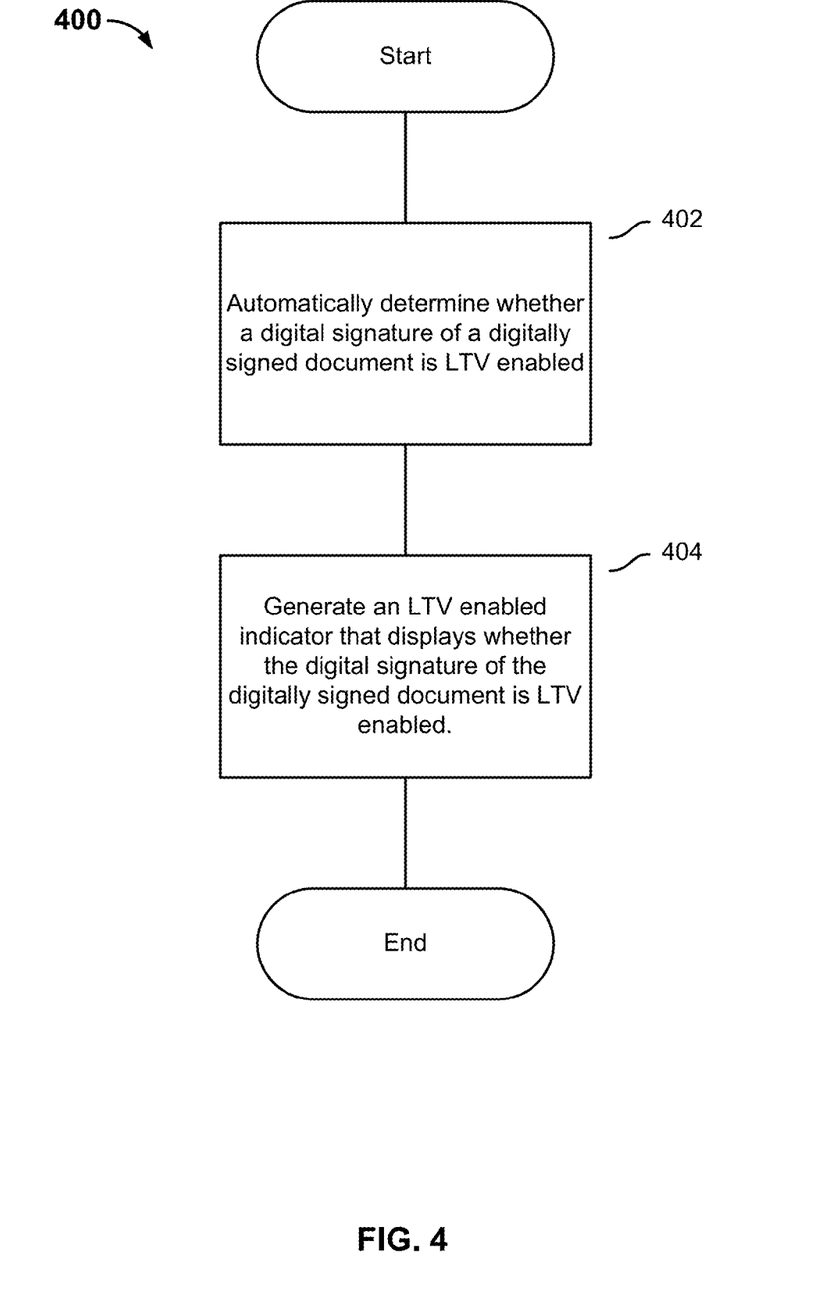
FIG. 4 is a flow diagram illustrating an embodiment of a process for indicating LTV status of a digital signature in accordance with some embodiments.

FIG. 4 is a flow diagram illustrating an embodiment of a process for indicating LTV status of a digital signature in accordance with some embodiments. In some embodiments, the process of FIG. 4 is executed by 102 of FIG. 1. In the example shown, in 402, whether a digital signature of a digitally signed document is LTV enabled is automatically determined. In 404, an LTV enabled indicator that displays whether the digital signature of the digitally signed document is LTV enabled is generated.

Figure 5:
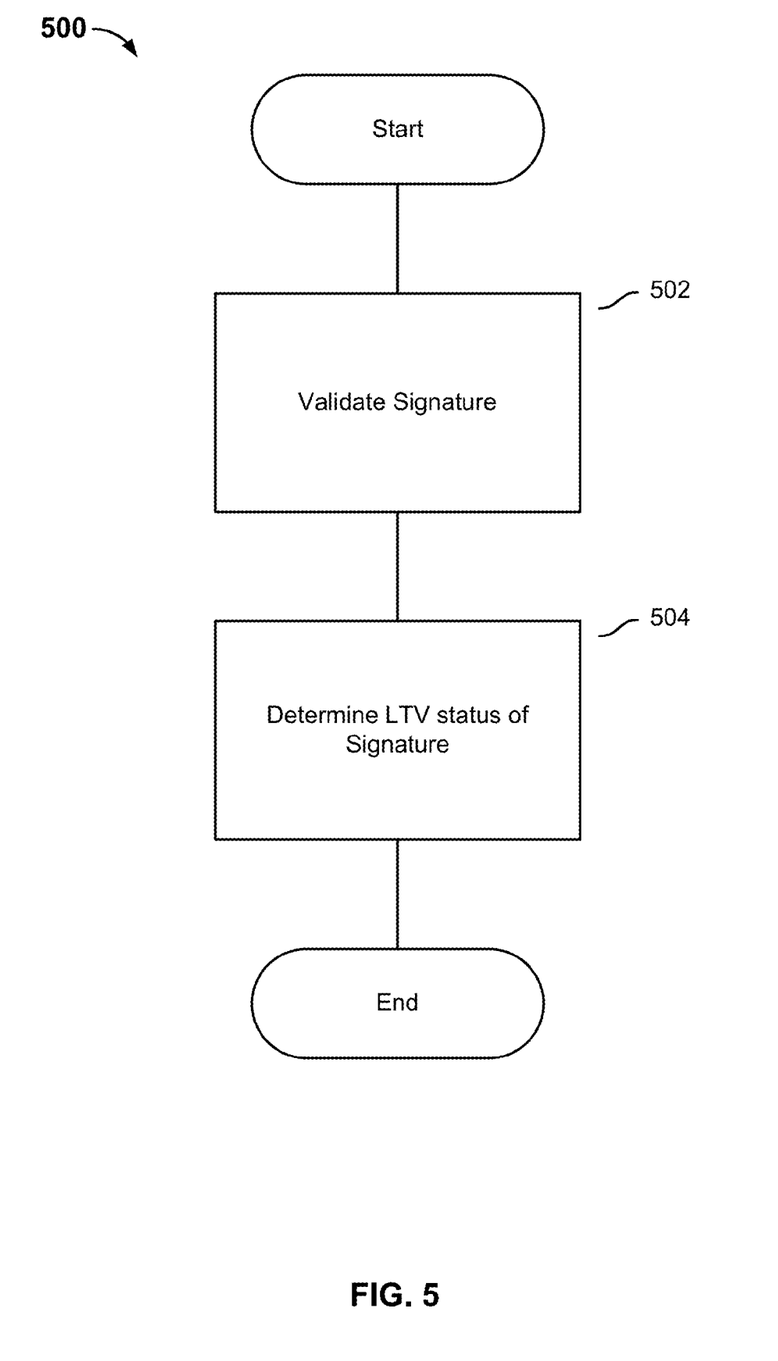
FIG. 5 is a flow diagram illustrating an embodiment of a process for automatically determining whether a digital signature of a digitally signed document is LTV enabled in accordance with some embodiments.

FIG. 5 is a flow diagram illustrating an embodiment of a process for automatically determining whether a digital signature of a digitally signed document is LTV enabled in accordance with some embodiments. In some embodiments, the process of FIG. 5 is used to implement process step 402 of FIG. 4. In the example shown, in 502, a signature is validated. In 504, the LTV status of the signature is determined. In some embodiments, the LTV verification process in 504 is performed and an LTV indicator status is computed as the validation process in 502 occurs (e.g., concurrently or alongside). In some embodiments, the LTV status of a digital signature is determined after performing a digital signature validation.

Figure 6:
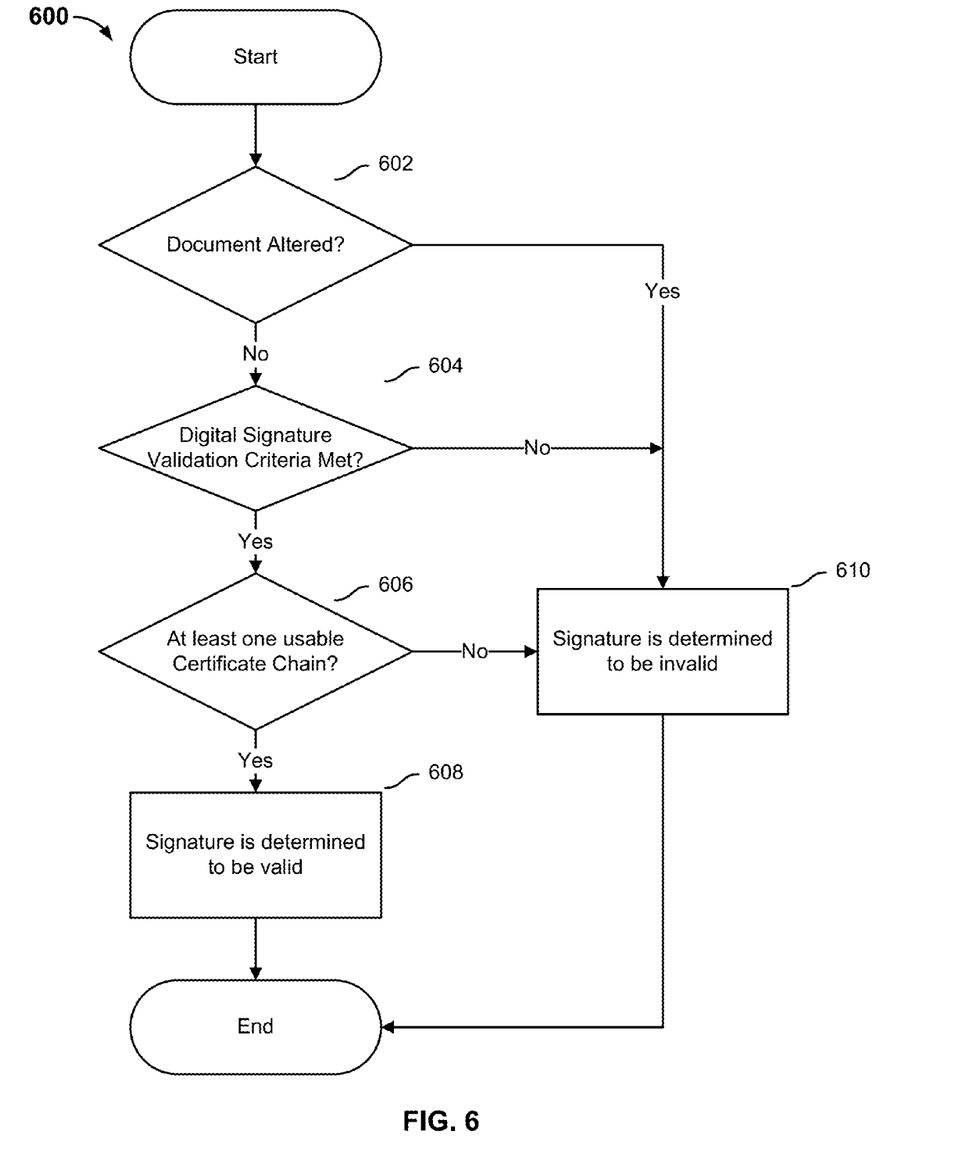
FIG. 6 is a flow diagram illustrating an embodiment of a process for validating a digital signature in accordance with some embodiments.

FIG. 6 is a flow diagram illustrating an embodiment of a process for validating a digital signature in accordance with some embodiments. In some embodiments, the process of FIG. 6 is used to implement process step 502 of FIG. 5. In some embodiments, the process of FIG. 6 is performed using digital signature validator 104 and LTV enabled recorder 106 of FIG. 1. In the example shown, in 602, the document that the digital signature is applied to is checked to determine whether it has been altered since the time of signing. In some embodiments, the determination at 602 includes checking if a hash value calculated for the document is the same as a hash from the signature. In some embodiments, in the event that it has been determined that the document has been altered (e.g., hashes are not the same), the signature is determined to be invalid. In some embodiments, the validation process of FIG. 6 continues but a user is notified that the document has been altered.

In 604, it is determined whether the digital signature under consideration is able to be validated. In some embodiments, prerequisite criteria or any other appropriate criteria for validation are evaluated before validation is performed with respect to the digital signature under consideration. In some embodiments, if prerequisite criteria for validation are not met, then validation of the digital signature is determined to not be trusted. In some embodiments, prerequisite criteria include that a Public Key Infrastructure (PKI) be in place, so that the validation process can query Certificate Authorities (CAs) and timestamp servers to verify identities, certificate status, time of signing for each signature, or any other appropriate information. In some embodiments, prerequisite criteria include that each user involved be connected to the Internet at the time they sign or try to validate a signature.

In some embodiments, prerequisite criteria for validation include that an entity signing the document has a valid digital ID that links to a trusted anchor. In some embodiments, one or more certificate chains associated with the digital signature (such as the ones described in FIGS. 2A and 2B) are determined (e.g., built or established), starting with the end entity certificate associated with the digital signature, tracing zero or more ICAs to establish a trust hierarchy including multiple levels until reaching a trusted higher authority such as a trust anchor root. In some embodiments, a trust anchor has been specified by a user or an organization. In some embodiments, if the digital signature is determined to not be linked to any trusted anchors, then the digital signature is determined to be invalid, and the validation process is determined to not be trusted and is determined to be invalid. In some embodiments, a plurality of certificate chains is determined, but at least one certificate chain must be found to a trusted anchor root (e.g., certificate authority). In the event that the digital signature is determined to be able to be validated, the process continues to 606.

In 606, the one or more determined (e.g., built) certificate chains are processed to determine whether there exists at least one usable (e.g., for validating a signature) certificate chain (e.g., all certificates in the certificate chain are determined to be usable). In some embodiments, if there exists at least one certificate chain from an end entity to a trusted anchor root where all certificates included in the certificate chain are determined to be usable, then the signature is also determined to be valid. Referring to the example certificate chain of FIG. 2B, it may be determined that the certificate chain including 203→205→207→211 is not usable due to ICA 2 207's certificate being determined to be not usable. However, the certificate chain including 203→205→209→213 may be determined to be usable. Since at least one certificate chain in the example of FIG. 2B was determined to be usable, then in some embodiments, the digital signature signed by EE 203 is also determined to be valid. If in 606 no usable certificate chains are determined to exist, then the signature is determined to be invalid. In some embodiments, each certificate chain determined in 604 is checked for usability in 606 until at least one certificate chain from an EE to a CA is determined to be usable, in which case the digital signature is also designated/indicated or determined to be valid, or until all possible certificate chains are determined to be not usable, in which case the digital signature is designated/indicated or determined to be invalid. In some embodiments, as soon as one certificate chain is determined to be usable, then the validation process ends (e.g., any remaining certificate chains that were waiting to be processed are not processed) and the digital signature is determined to be valid. In some embodiments, if the digital signature is determined to be invalid, then the digital signature is also determined to not be LTV-enabled, and an LTV status indicator is displayed indicating that the digital signature is not LTV-enabled.

In various embodiments, the process of FIG. 6 is performed at the time a signature is applied, a set amount of time after the signature is applied (e.g., 24 hours after signing the digital signature in case a certificate has been stolen and to allow time for reporting of the stolen certificate so that it is revoked), at the time the document and digital signature is opened, or any other appropriate time. In some embodiments, the process of FIG. 6 is used to validate a timestamp associated with the digital signature. In some embodiments, the timestamp associated with the digital signature is also signed, and the timestamp is associated with a corresponding timestamp certificate chain that is processed to validate the signature that was applied to the timestamp.

Figure 7:
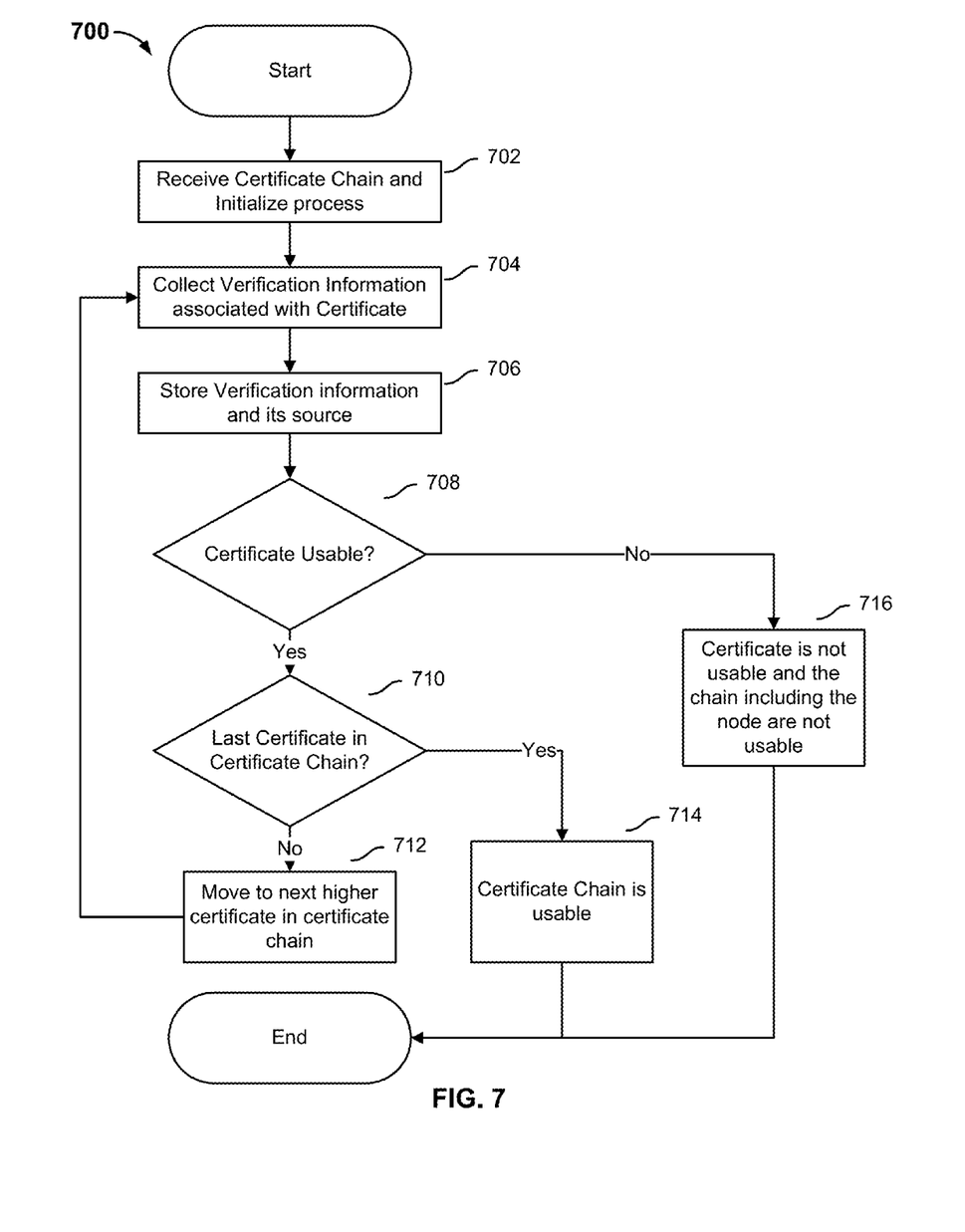
FIG. 7 is a flow diagram illustrating an embodiment of a process for determining the usability of a certificate chain in accordance with some embodiments.

FIG. 7 is a flow diagram illustrating an embodiment of a process for determining the usability of a certificate chain in accordance with some embodiments. In some embodiments, the usability of a certificate chain determined in FIG. 7 refers to its usability in validating a signature. In some embodiments, the process of FIG. 7 is used to implement process step 606 of FIG. 6. In some embodiments, the process of FIG. 7 comprises a recursive process, in which each certificate in the certificate chain is checked for usability by recursively traversing the certificate chain, beginning, for example, with processing an end entity certificate, walking up the certificate chain successively processing the certificate of the authority at the next higher level in the chain, until the trusted anchor root of the certificate chain is reached.

In 702, a certificate chain to be checked for usability is received and the processing of the certificate chain is initialized. In some embodiments, the certificate chain to be processed comprises one of the certificate chains determined in process step 604 of FIG. 6. In some embodiments, the current date and time are also received. In some embodiments, in the initialization of the recursive process, a starting certificate (e.g. End Entity certificate) of the certificate chain to be processed is selected to initialize the usability determination process.

In 704, verification information associated with the current certificate under consideration is collected from various sources, and the sources of the certificate and associated verification information are recorded. In some embodiments, verification information includes revocation information, optional timestamp information, or any other appropriate verification information. In some embodiments, verification information includes the certificates in the usable certificate chain.

In various embodiments, sources of a certificate include OS-maintained certificate stores, online stores, a local machine's hard drive, the document that the digital signature is applied to (e.g., embedded in document or appended as metadata to the document), or any other appropriate source of a certificate. In some embodiments, in order to assist in the determination of the LTV status of a digital signature, the signature validation process keeps track of the source of each certificate in the certificate chain(s) and marks it so that the LTV status determination process may later ascertain whether a particular certificate is embedded in the document or not.

In various embodiments, sources of revocation information include online sources (e.g., OCSP, CRL, certificate authority) or any other appropriate sources of revocation information. In some embodiments, an application performing signature validation caches revocation information on a local computer and/or embeds it in the document. In various embodiments, sources of revocation information include online, local cache, embedded in the document, or any other appropriate source for revocation information. In some embodiments the verification information associated with the certificate, if not already embedded in the document, is embedded in the document after it has been collected from its source. In some embodiments, the information indicating the sources of certificates and verification information is used to determine the LTV status of the digital signature, for example, at a later time after the certificates have expired to determine that the certificates were valid at the time of signing the digital signature. In some embodiments, in order to assist in the determination of the LTV status of a digital signature, the signature validation process keeps track of the source of each revocation information piece and marks it so that the LTV status determination process can later ascertain whether a particular revocation information piece is embedded in the document or not.

In 706, the certificate, verification information and an indication of the sources of the certificate and associated verification information is recorded, marked, and stored. In some embodiments, the stored certificate, verification information, and their respective sources comprise LTV information that is stored for future use in the process of LTV status determination. In some embodiments, the recording, marking, and storing of the sources of the certificate and associated verification information or any other appropriate LTV information is done at the time of validation or at a time different from the time of the validation process. In some embodiments, a marker indicating the source of verification information is recorded and stored. In various embodiments, verification information associated with a certificate includes the certificate itself, an optional timestamp, revocation information (e.g., information indicating whether the certificate has been revoked or not, as determined, for example, through OCSP or CRL), expiration information, or any other appropriate verification information. In some embodiments if a timestamp (if present) is signed, its verification information is subject to the same processing as any other signature.

In some embodiments, any relevant verification, revocation, or online validity information is recorded, marked, or stored and logged for potential later use as LTV information. In some embodiments, the LTV information is embedded in the digitally signed document (e.g., in the digital signature or appended as metadata). In some embodiments, the LTV information is stored in a container (e.g., zip file) that includes the digitally signed document. In some embodiments, the LTV information is stored online, and the digitally signed document includes a link or identifier for later accessing the LTV information. In some embodiments, LTV information is collected from the Certificate Authority that issued the certificate under consideration, using OCSP or CRL, or any other appropriate source of LTV information. In some embodiments, if the certificate under consideration has expired or been revoked, or the certificate authority that issued the certificate under consideration has expired or been revoked, then the certificate is not usable and LTV information cannot be embedded. In some embodiments, a certificate authority does not maintain revocation information for expired certificates.

In 708, the determination of whether the certificate under consideration is usable is based at least in part on the verification information collected and stored in process steps 704 and 706. For example, using the collected and stored verification information, it can be determined whether the certificate has expired or been revoked. In some embodiments, if the certificate has been expired, revoked, or is otherwise determined to be not usable, and the certificate chain including the certificate is also determined to be not usable and the process ends. In some embodiments, the usability of the certificate is determined with respect to the current date and time or to some point in the past.

In the event that the certificate under consideration is determined to be usable, in 710 it is determined whether the certificate under consideration is the last certificate in the certificate chain (e.g. a trusted anchor root). In the event that the certificate is the last certificate of the certificate chain being processed, then the certificate chain is determined to be usable and the process ends.

In the event that the certificate under consideration is not the last certificate in the certificate chain, then in 712, the recursive process of FIG. 7 traverses the certificate chain and moves to the next higher certificate in the certificate chain (e.g., certificate of ICA or CA that signed the certificate that has just been processed and determined to be usable), and the process returns to 702 to process the next certificate under consideration.

In the example of FIG. 7, the collection of LTV information and its sources associated with a certificate to a document is performed as part of the validation process of a signature. In some embodiments, the collection of LTV information and its sources associated with certificates in a signature is performed as a separate process.

Figure 8:
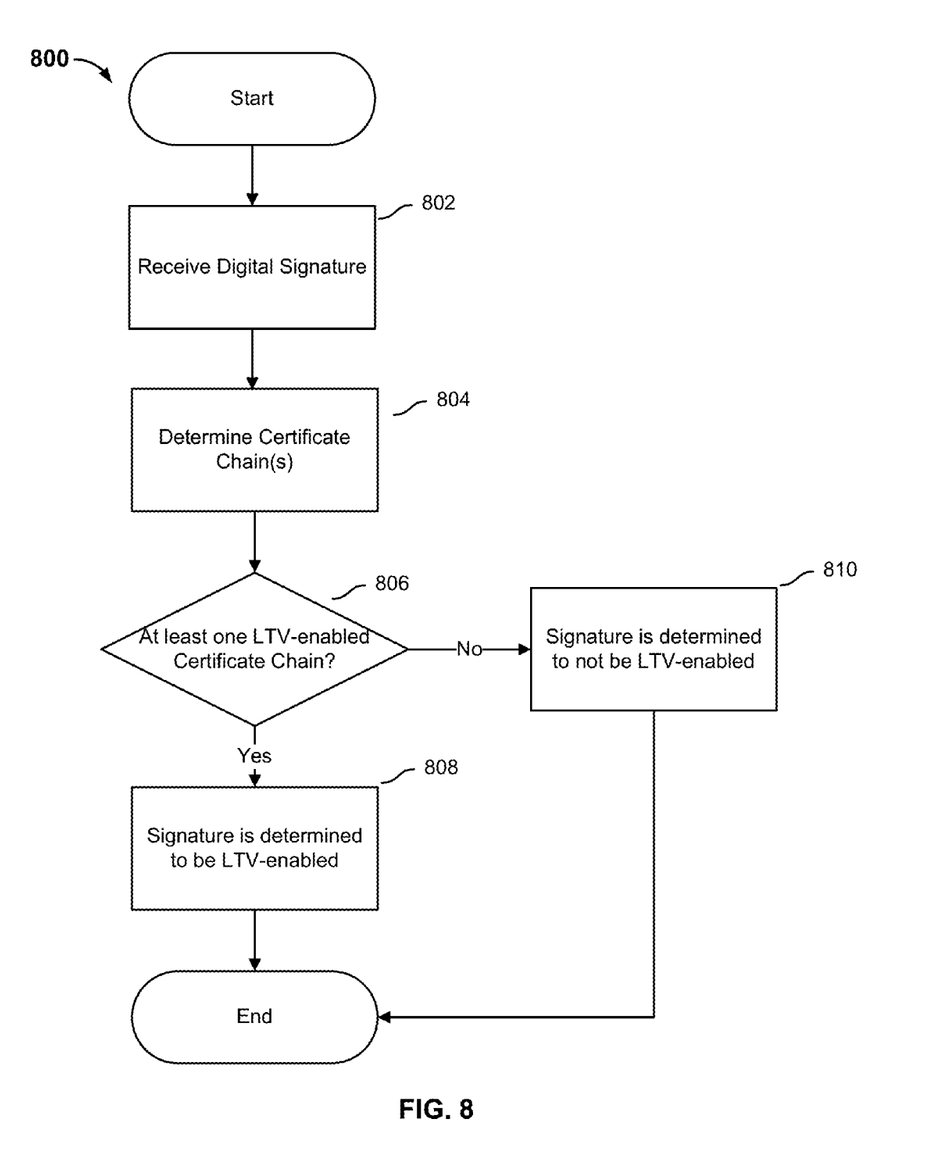
FIG. 8 is a flow diagram illustrating an embodiment of a process for determining the LTV status of a digital signature in accordance with some embodiments.

FIG. 8 is a flow diagram illustrating an embodiment of a process for determining the LTV status of a digital signature in accordance with some embodiments. In some embodiments, the process of FIG. 8 implements process step 504 of FIG. 5. In some embodiments, the process of FIG. 8 is performed using LTV enabled verifier 108 of FIG. 1. In the example shown, in 802, a digital signature is received. In 804, one or more certificate chains (such as the ones described in FIGS. 2A and 2B) are determined (e.g., built or established), starting with the end entity certificate associated with the digital signature, tracing zero or more ICAs to establish a trust hierarchy including multiple levels until reaching a trusted higher authority such as a trusted anchor root. In some embodiments, a plurality of certificate chains associated with the digital signature is determined.

In 806, the one or more certificate chains determined (e.g., built) in process step 804 are processed to determine whether there exists at least one LTV-enabled certificate chain (e.g., all certificates in the certificate chain are determined to be usable). In some embodiments, if there exists at least one certificate chain from an end entity to a trusted anchor where all certificates included in the certificate chain are determined to be LTV-enabled, then the signature is also determined to be LTV-enabled. Referring to the example certificate chain of FIG. 2B, it may be determined that the certificate chain including 203→205→207→211 is not LTV-enabled due to ICA 2 207's certificate being determined to be not LTV-enabled. However, the certificate chain including 203→205→209→213 may be determined to be LTV-enabled. Since at least one certificate chain in the example of FIG. 2B was determined to be LTV-enabled, then in some embodiments, the digital signature signed by EE 203 is also determined to be LTV-enabled. If in 606 no LTV-enabled certificate chains are determined to exist, then the signature is determined to be not LTV-enabled. In some embodiments, each of the certificate chains determined in 804 are checked for LTV status in 806 until at least one certificate chain from an EE to a CA is determined to be LTV-enabled, in which case the digital signature is also designated/indicated or determined to be LTV-enabled, or until all possible certificate chains are determined to be not LTV-enabled, in which case the digital signature is designated/indicated or determined to be not LTV-enabled. In some embodiments, as soon as one certificate chain is determined to be LTV-enabled, then the LTV status verification process ends (e.g., any remaining certificate chains that were waiting to be processed are not processed) and the digital signature is determined to be LTV-enabled. In some embodiments, if no certificate chains are determined to be LTV-enabled, then the digital signature is determined to be not LTV-enabled, and an LTV status indicator is displayed indicating that the digital signature is not LTV-enabled.

In some embodiments, determination of the LTV status of a digital signature can only be performed for valid digital signatures.

Figure 9:
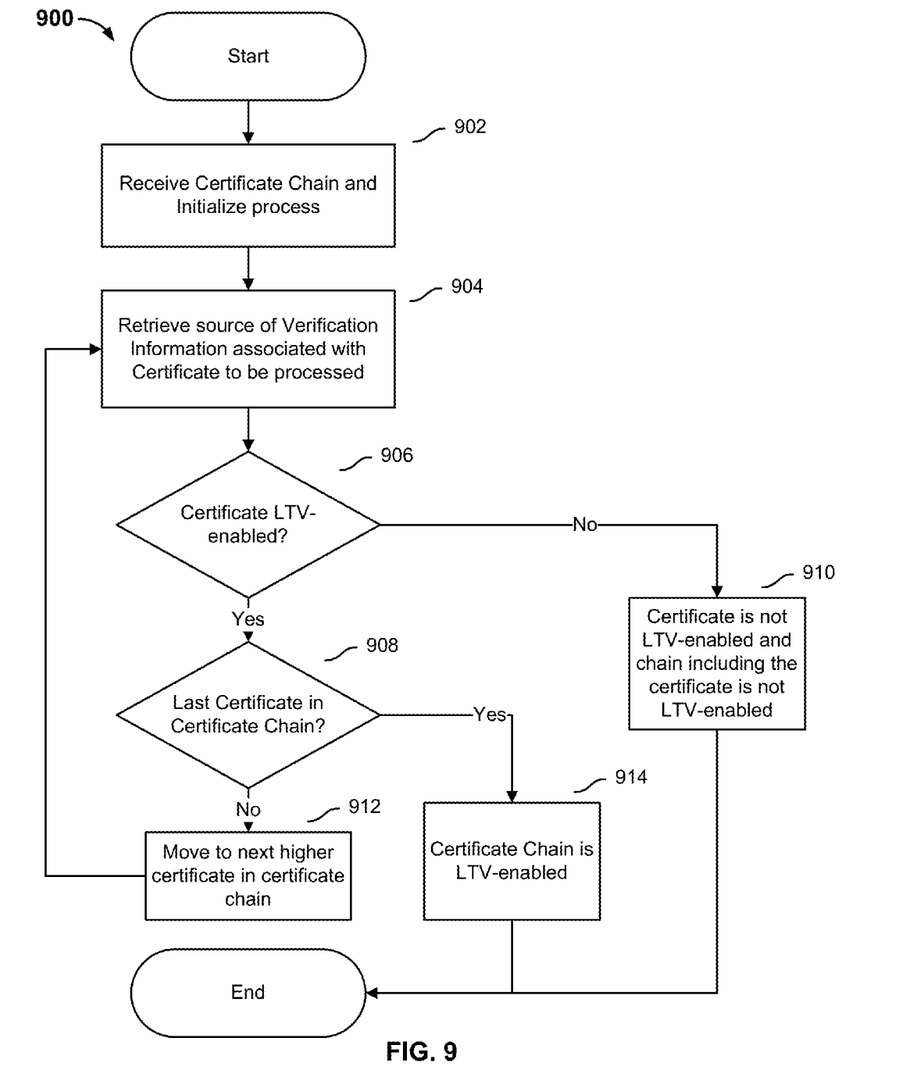
FIG. 9 is a flow diagram illustrating an embodiment of a process for determining the LTV status of a certificate chain in accordance with some embodiments.

FIG. 9 is a flow diagram illustrating an embodiment of a process for determining the LTV status of a certificate chain in accordance with some embodiments. In some embodiments, the process of FIG. 9 is used to implement process step 806 of FIG. 8. In some embodiments, the process of FIG. 9 comprises a recursive process, in which each certificate in the certificate chain is processed by recursively traversing the certificate chain, beginning, for example, with processing an end entity certificate, walking up the certificate chain successively processing the certificate of the authority at the next higher level in the chain, until the trusted anchor root of the certificate chain is reached.

In 902, a certificate chain is received and the determination of the LTV status of the certificate chain is initialized. In some embodiments, the certificate chain to be processed comprises one of the certificate chains determined in process step 804 of FIG. 8. In some embodiments, in the initialization of the recursive process, a starting certificate (e.g. End Entity certificate) of the certificate chain to be processed is selected to initialize the LTV verification process.

In 904, LTV information used to verify whether a certificate of the certificate chain is LTV enabled is retrieved. In various embodiments, LTV information includes indications of the sources of verification information associated with the current certificate under consideration and any relevant stored LTV information (e.g., revocation or online validity information). In some embodiments, LTV enabled information includes self-contained information (e.g., is stored in the document). In some embodiments, the verification information and sources of verification information comprise the verification information and sources of verification information recorded and stored in process step 704 of FIG. 7.

In 906, the LTV status of the certificate under consideration is determined. In some embodiments, the determination is based at least in part on the indicated sources of verification information and any relevant LTV information retrieved in process step 904. In some embodiments, if the certificate has been determined to be not LTV-enabled, then the certificate chain including the certificate is also determined to be not LTV-enabled and the process ends.

In some embodiments, the expiration date of the certificate is noted so that it may be indicated by an LTV status indicator. For example, it may be determined that all certificates in a certificate chain are LTV-enabled except for a certificate whose source of LTV information was not an appropriate LTV source, but that if the LTV information were collected and stored in an appropriate LTV source (e.g., collected from online and embedded in the signed document) prior to the expiration of the certificate (which, in some embodiments, is indicated), then the certificate chain would have been LTV-enabled. In some embodiments, the digital signature would also then be LTV-enabled. In some embodiments, the process does not end if the certificate is determined to be not LTV-enabled, and each certificate in the chain is processed to determine and note if it can be LTV-enabled after further action is taken.

In the event that the certificate under consideration is determined to be LTV-enabled, in 908 it is determined whether the certificate under consideration is the last certificate in the certificate chain (e.g. a trusted anchor root). In the event that the certificate is the last certificate of the certificate chain being processed, and all certificates in the certificate chain have been determined to be LTV-enable, then the certificate chain is determined to be LTV-enabled and the process ends.

In the event that the certificate under consideration is not the last certificate in the certificate chain, then in 912, the recursive process of FIG. 9 traverses the certificate chain and moves to the next higher certificate in the certificate chain (e.g., certificate of ICA or CA that signed the certificate that has just been processed and had its LTV status checked), and the process returns to 902 to process the next certificate under consideration.

Figure 10:
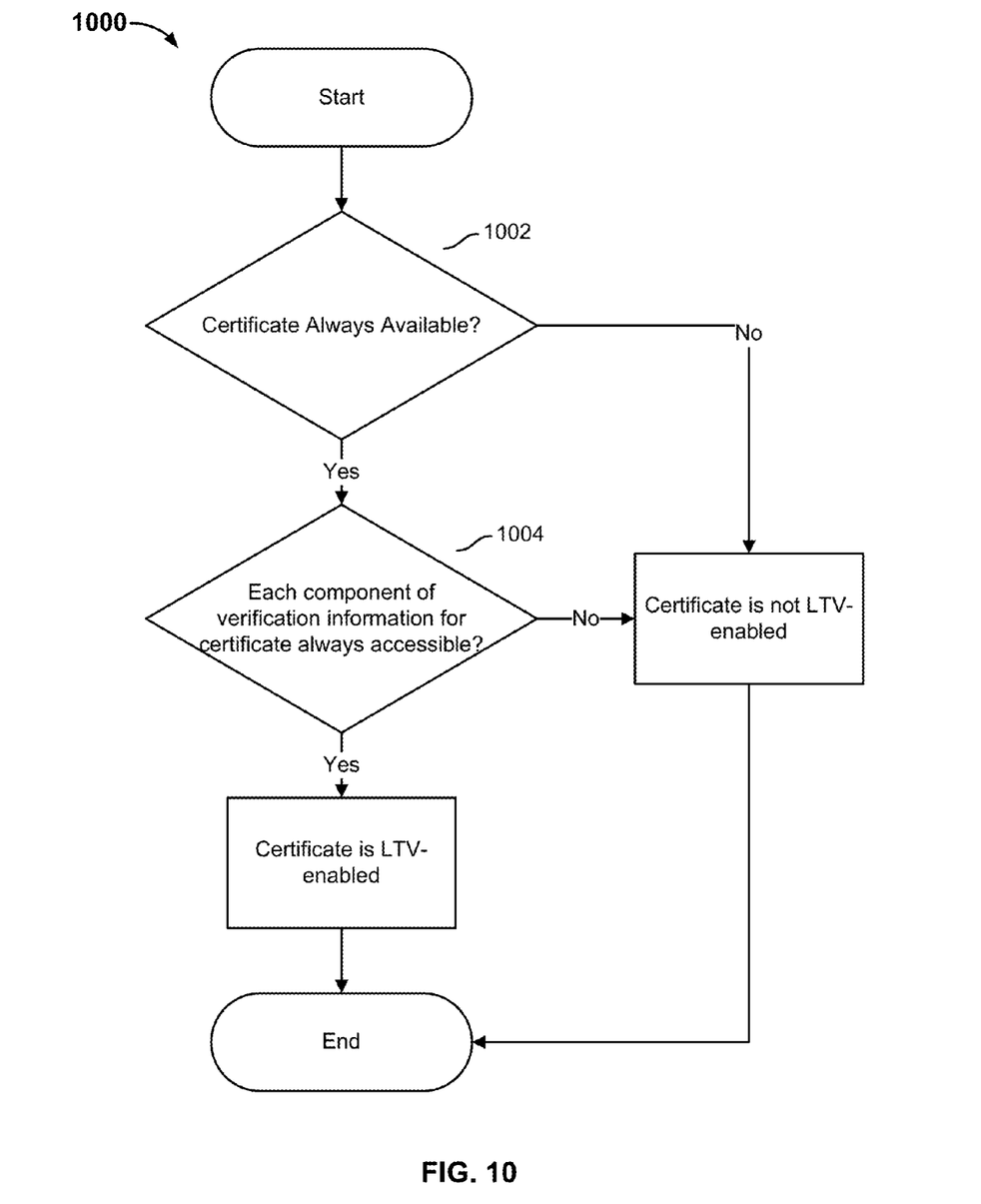
FIG. 10 is a flow diagram illustrating an embodiment of a process for determining the LTV status of a certificate in accordance with some embodiments.

FIG. 10 is a flow diagram illustrating an embodiment of a process for determining the LTV status of a certificate in accordance with some embodiments. In some embodiments, the process of FIG. 10 is used to implement process step 906 of FIG. 9.

In 1002, it is determined whether the certificate is always available. In various embodiments, a certificate itself is always available if it is located either in the signed document itself (e.g., embedded in signature or appended to document), as associated metadata, in the same container the signed document is contained in (e.g., same ZIP file), or in any other appropriate location that is always accessible.

In 1004, it is determined whether each component of verification information (e.g., certificate itself, an optional timestamp, revocation information) associated with the certificate is always accessible. In some embodiments, the determination of whether each component of verification information is accessible comprises a determination of whether an indicated source of verification information is designated as an acceptable LTV source. In some embodiments, a source of verification information is designated as an acceptable LTV source if it always accessible (e.g., embedded in the document, or stored in a container, such as a zip file, along with the document). For example, in some embodiments, an online source is not considered an acceptable LTV source because it cannot be accessed if an application performing the LTV status determination is not always connected to the Internet. In some embodiments, if the certificate under consideration is not located in the document (e.g., embedded or appended as metadata), then the certificate under consideration is determined to not be LTV enabled. In some embodiments, if the revocation information for the certificate under consideration is not located in the document, then the certificate under consideration is determined to not be LTV-enabled.

In some embodiments, the status of an LTV indicator is computed at least in part by the LTV verification process using the information collected and recorded during the validation process. In some embodiments, based on the processing, an LTV status indicator such as the one exemplified in FIG. 3 is provided (e.g., displayed) that shows whether LTV information associated with the digital signature is present and/or complete. In some embodiments, the LTV status indicator indicates whether LTV functionality can be enabled for the digital signature, and indicates a time by which action can be taken to enable LTV support for the digital signature. In some embodiments, the LTV status indicator also indicates one or more actions that can be taken by the indicated time limit to enable LTV-functionality for the digital signature. In some embodiments, the display of the LTV status indicator is controlled based at least in part on the LTV information recorded during signature validation and the completeness of the gathered information as determined during LTV signature verification.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   determining that a digital signature of a digitally signed document is not enabled for long-term validation, wherein the long-term validation comprises validating the digital signature after an expiration of a digital certificate used to digitally sign the document;
   identifying a required action for enabling the digital signature for the long-term validation, wherein identifying the required action comprises identifying a time period in which the long-term validation can be enabled; and
   providing a long-term validation indicator that indicates that the digital signature is not enabled for the long-term validation, identifies the required action for enabling the long-term validation, and identifies the time period in which the long-term validation can be enabled.

2. The method of claim 1, wherein the time period is identified based on expiration data for the digital certificate.

3. The method of claim 1, further comprising:
   subsequent to the expiration of the time period, determining that the digital signature of the digitally signed document is not enabled for long-term validation; and
   providing an updated long-term validation indicator indicating that the digital signature cannot be enabled for the long-term validation.

4. The method of claim 1, wherein identifying the required action further comprises determining that the long-term validation can be enabled by embedding revocation data or expiration data for the digital certificate in the document.

5. The method of claim 1, wherein determining that the digital signature is not enabled for long-term validation comprises:
   identifying a plurality of certificates in a certificate chain, wherein the certificate chain includes the digital certificate used to digitally sign the document; and
   determining that at least one certificate from the plurality of certificates is not enabled for long-term validation.

6. The method of claim 1, further comprising:
   determining that the required action has been performed subsequent to providing the long-term validation indicator; and
   providing an updated long-term validation indicator indicating that the digital signature of the digitally signed document is enabled for the long-term validation.

7. A system comprising:
   a processor; and
   a non-transitory computer-readable medium coupled to the processor,
   wherein the processor is configured to execute instructions stored on the non-transitory computer-readable medium to perform operations comprising:
      determining that a digital signature of a digitally signed document is not enabled for long-term validation, wherein the long-term validation comprises validating the digital signature after an expiration of a digital certificate used to digitally sign the document,
      identifying a required action for enabling the digital signature for the long-term validation, wherein identifying the required action comprises identifying a time period in which the long-term validation can be enabled, and
      providing a long-term validation indicator that indicates that the digital signature is not enabled for the long-term validation, identifies the required action for enabling the long-term validation, and identifies the time period in which the long-term validation can be enabled.

8. The system of claim 7, wherein the time period is identified based on expiration data for the digital certificate.

9. The system of claim 7, wherein the operations further comprise:

subsequent to the expiration of the time period, determining that the digital signature of the digitally signed document is not enabled for long-term validation; and providing an updated long-term validation indicator indicating that the digital signature cannot be enabled for the long-term validation.

10. The system of claim 7, wherein identifying the required action further comprises determining that the long-term validation can be enabled by embedding revocation data or expiration data for the digital certificate in the document.

11. The system of claim 7, wherein determining that the digital signature is not enabled for long-term validation comprises:
identifying a plurality of certificates in a certificate chain, wherein the certificate chain includes the digital certificate used to digitally sign the document; and
determining that at least one certificate from the plurality of certificates is not enabled for long-term validation.

12. The system of claim 7, further comprising:
determining that the required action has been performed subsequent to providing the long-term validation indicator; and
providing an updated long-term validation indicator indicating that the digital signature of the digitally signed document is enabled for the long-term validation.

13. A non-transitory computer-readable medium tangibly embodying program code executable by a processor, the program code comprising:
program code for determining that a digital signature of a digitally signed document is not enabled for long-term validation, wherein the long-term validation comprises validating the digital signature after an expiration of a digital certificate used to digitally sign the document;
program code for identifying a required action for enabling the digital signature for the long-term validation, wherein identifying the required action comprises identifying a time period in which the long-term validation can be enabled; and
program code for providing a long-term validation indicator that indicates that the digital signature is not enabled for the long-term validation, identifies the required action for enabling the long-term validation, and identifies the time period in which the long-term validation can be enabled.

14. The non-transitory computer-readable medium of claim 13, wherein the time period is identified based on expiration data for the digital certificate.

15. The non-transitory computer-readable medium of claim 13, further comprising:
program code for determining that the digital signature of the digitally signed document is not enabled for long-term validation subsequent to the expiration of the time period; and
program code for providing an updated long-term validation indicator indicating that the digital signature cannot be enabled for the long-term validation.

16. The non-transitory computer-readable medium of claim 13, wherein identifying the required action further comprises determining that the long-term validation can be enabled by embedding revocation data or expiration data for the digital certificate in the document.

17. The non-transitory computer-readable medium of claim 13, further comprising:
determining that the required action has been performed subsequent to providing the long-term validation indicator; and
providing an updated long-term validation indicator indicating that the digital signature of the digitally signed document is enabled for the long-term validation.

* * * * *